United States Patent
Lai et al.

(10) Patent No.: US 10,155,665 B2
(45) Date of Patent: Dec. 18, 2018

(54) ZEOLITE SYNTHESIS WITH DOMINANT AND SECONDARY TEMPLATES

(71) Applicants: Wenyih Frank Lai, Bridgewater, NJ (US); Nicholas S. Rollman, Hamburg, PA (US); Jenna L. Walp, Bethlehem, PA (US); William W. Lonergan, Humble, TX (US)

(72) Inventors: Wenyih Frank Lai, Bridgewater, NJ (US); Nicholas S. Rollman, Hamburg, PA (US); Jenna L. Walp, Bethlehem, PA (US); William W. Lonergan, Humble, TX (US)

(73) Assignee: EXXONMOBIL RESEARCH AND ENGINEERING COMPANY, Annadale, NJ (US)

( * ) Notice: Subject to any disclaimer, the term of this patent is extended or adjusted under 35 U.S.C. 154(b) by 422 days.

(21) Appl. No.: 14/887,464

(22) Filed: Oct. 20, 2015

(65) Prior Publication Data
US 2016/0122193 A1    May 5, 2016

Related U.S. Application Data

(60) Provisional application No. 62/074,220, filed on Nov. 3, 2014.

(51) Int. Cl.
*C01B 39/48* (2006.01)
*B01J 29/70* (2006.01)
*C01B 39/04* (2006.01)

(52) U.S. Cl.
CPC ............ *C01B 39/48* (2013.01); *B01J 29/703* (2013.01); *C01B 39/04* (2013.01)

(58) Field of Classification Search
CPC ......... C01B 39/48; C01B 39/04; B01J 29/703
See application file for complete search history.

(56) References Cited

U.S. PATENT DOCUMENTS

| | | | |
|---|---|---|---|
| 3,306,922 A | 2/1967 | Barrer et al. | |
| 3,354,078 A | 11/1967 | Miale et al. | |
| 3,832,449 A | 8/1974 | Rosinski et al. | |
| 4,326,994 A | 4/1982 | Haag et al. | |
| 4,397,827 A * | 8/1983 | Chu | B01J 29/703 423/331 |
| 6,923,949 B1 * | 8/2005 | Lai | C01B 39/48 423/705 |
| 7,482,300 B2 | 1/2009 | Lai et al. | |
| 8,003,074 B2 * | 8/2011 | Lai | B01J 29/703 423/704 |

FOREIGN PATENT DOCUMENTS

| | | |
|---|---|---|
| CN | 102452667 A | 5/2012 |
| EP | 0023089 A1 | 1/1981 |
| EP | 1330412 B1 | 4/2007 |
| WO | 2007070522 A1 | 6/2007 |
| WO | 2009038740 A2 | 3/2009 |

OTHER PUBLICATIONS

Verified Synthesis of Zeolitic Materials, Second Revised Edition, Robson, ed., Elsevier (2001).*
International Search Report and Written Opinion of PCT/US2015/056341 dated Jan. 22, 2016.
Miale, J.N. et al., "Catalysis by Crystalline Aluminosilicates IV. Attainable Catalystic Cracking Rate Constants, and Superactivity," Journal of Catalysis, 1966, vol. 6, pp. 278-287.
Olson, D. H. et al., "Chemical and Physical Properties of the ZMS-5 Substitutional Series," Journal of Catalysis, 1980, vol. 61, pp. 390-396.
Weisz, P.B. et al., "Suepractive Crystalline Aluminosilicate Hydrocarbon Catalysts," Journal of Catalysis, 1965, vol. 4, pp. 527-529.
Emdadi et al., "Dual Template Synthesis of Meso- and Microporous MFI Zeolite Nanosheet Assemblies with Tailored Activity in Catalytic Reactions", Chemistry of Materials, Feb. 11, 2014, pp. 1345-1355, vol. 26, No. 3, ACS Publications.
PCT/US2015/056327 International Search Report and Written Opinion dated Feb. 11, 2016.

* cited by examiner

*Primary Examiner* — David M Brunsman
(74) *Attorney, Agent, or Firm* — Amanda K. Norwood; Lisa K. Holthus

(57) ABSTRACT

Methods are provided for synthesis of various types of zeolites using synthesis mixtures that contain a dominant structure directing agent and one or more secondary structure directing agents. Advantageously, the secondary structure directing agents may substantially not alter the crystal structure and/or morphology of the crystals generated by a synthesis mixture in the presence of the dominant structure directing agent.

21 Claims, 3 Drawing Sheets

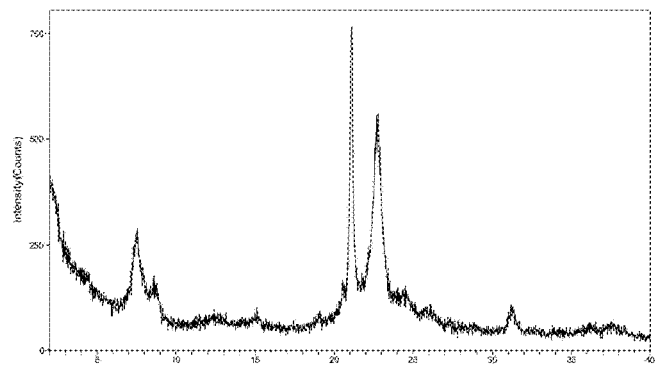
Figure 1: XRD on Example 5
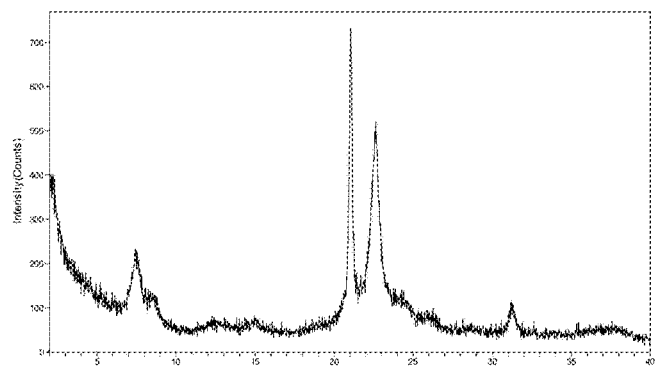
Figure 2: XRD on Example 7
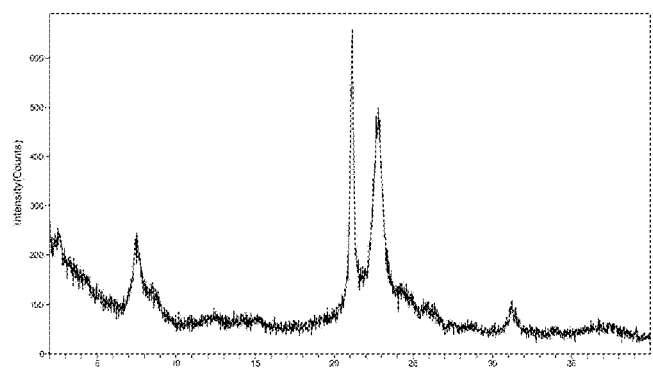
Figure 3: XRD on Example 9

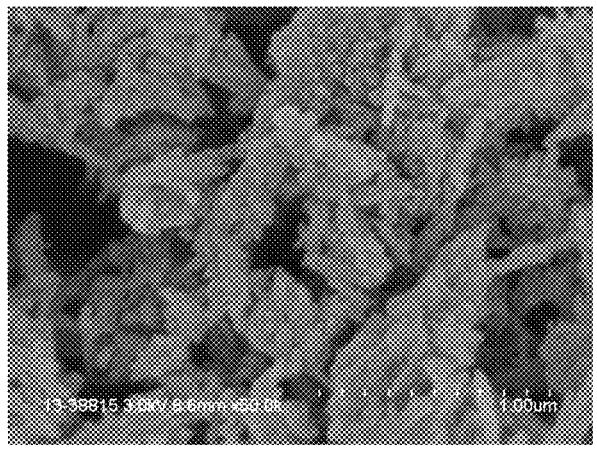
Figure 4: SEM on Example 5
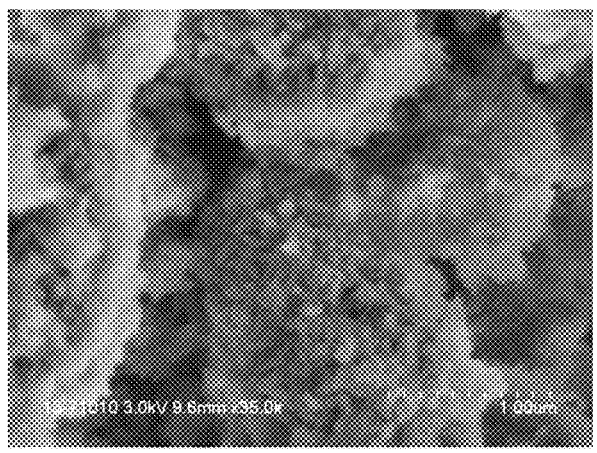
Figure 5: SEM on Example 7
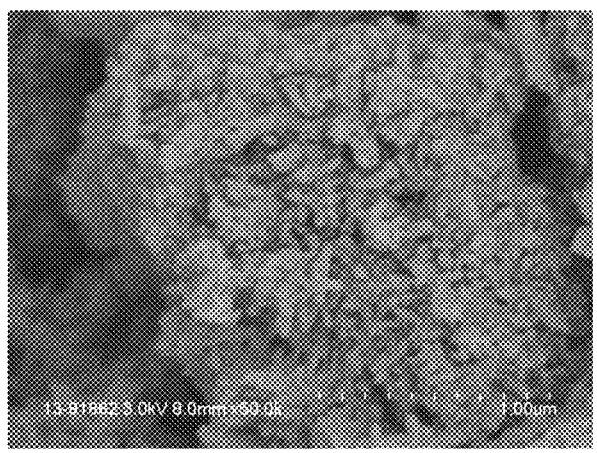
Figure 6: SEM on Example 9

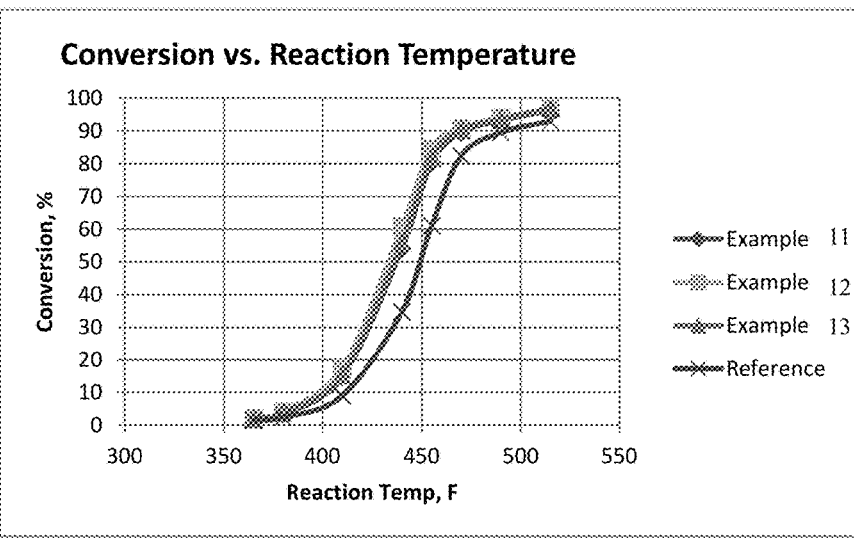
Figure 7: Conversion vs. Reaction temperatures
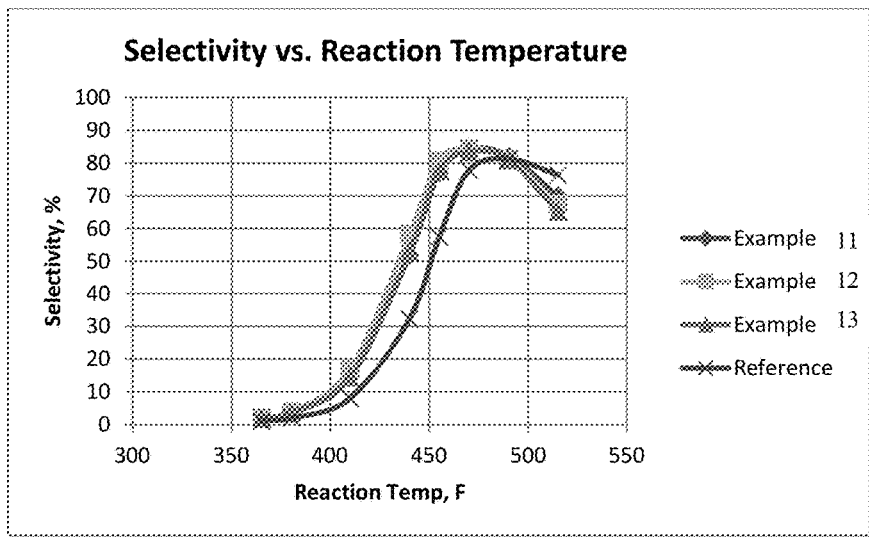
Figure 8: Selectivity vs. Reaction temperatures

ZEOLITE SYNTHESIS WITH DOMINANT AND SECONDARY TEMPLATES

CROSS-REFERENCE TO RELATED APPLICATIONS

This application claims the benefit of provisional U.S. Ser. No. 62/074,220, filed Nov. 3, 2014, the entire contents of which are expressly incorporated by reference herein.

FIELD OF THE INVENTION

Methods are provided for zeolite synthesis using multiple structure directing agents.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One type of zeolite structure used for catalytic processing of petroleum streams is ZSM-48, which is a zeolite of the MRE framework type. As for many zeolites, the composition of the synthesis mixture used to form ZSM-48 (or other MRE framework type zeolites) can have a strong impact on the crystalline structure and/or morphology of the resulting zeolites.

U.S. Pat. No. 6,923,949 describes methods for forming ZSM-48 crystals using synthesis mixtures that include non-ZSM-48 seed crystals. The resulting ZSM-48 crystals can have an X-ray diffraction pattern corresponding to ZSM-48, although the presence of the non-ZSM-48 seed crystals can be detected based on activity tests. For crystals having a silica to alumina ratio of about 70 to 1 to 150 to 1, the ZSM-48 crystals formed using non-ZSM-48 seeds are described as being small, irregularly shaped crystals that are free from fibrous morphology. For crystals with a silica to alumina ratio of less than 70 to 1, the ZSM-48 crystals are described as being mixtures of small, irregularly shaped crystals and needle morphology crystals.

U.S. Pat. No. 7,482,300 describes methods for forming ZSM-48 crystals without the use of non-ZSM-48 seeds in the synthesis mixture for forming the crystals. The structure directing agent used for forming the ZSM-48 crystals is described as a hexamethonium salt, such as hexamethonium chloride. The resulting crystals can have a silica to alumina ratio from about 70 to 1 to about 110 to 1, and are described as being substantially free of fibrous morphology. Preferred ranges are also described for the molar ratio of $OH^-$ to $SiO_2$ and the molar ratio of structure directing agent (or template) to $SiO_2$. The preferred ranges are described as suitable for formation of crystals that are substantially free of needle-like morphology crystals.

U.S. Pat. No. 8,003,074 describes methods for forming ZSM-48 crystals using a diquaternary ammonium salt structure directing agent with a 5 carbon atom alkyl chain between the ammonium ions (a "diquat-5" structure directing agent). Synthesis of ZSM-48 crystals using mixtures of a "diquat-5" structure directing agent and other structure directing agents, such as a "diquat-6" structure directing agent, is also described. Various types of synthesis mixtures are described that result in formation of fibrous and/or needle-like crystal morphologies. This patent is hereby incorporated by reference.

SUMMARY OF THE INVENTION

In one aspect, a method of synthesizing ZSM-48 crystals is provided. The method can include crystallizing a reaction mixture to form ZSM-48 crystals under effective synthesis conditions, the reaction mixture comprising a source of water, a source of silicon, a source of aluminum, a source of an alkali metal, M, a source of a dominant structure directing agent in the form of an organic cation $Q_1$, and a source of a secondary structure directing agent in the form of an organic cation $Q_2$, a combined amount of dominant structure directing agent cation $Q_1$ and secondary structure directing agent cation $Q_2$ corresponding to a combined amount of structure directing agent cation Q, the reaction mixture advantageously having a molar ratio of combined structure directing agent cation Q to silicon measured as $SiO_2$ in said reaction mixture from about 0.01 to about 0.20; a molar ratio of silicon measured as $SiO_2$ to aluminum measured as $Al_2O_3$ in said reaction mixture from about 50 to about 200; a molar ratio of water to silicon measured as $SiO_2$ in said reaction mixture from about 1 to about 500; a molar ratio of hydroxyl group concentration to silicon measured as $SiO_2$ in said reaction mixture is from about 0.1 to about 0.3; and a molar ratio of alkali metal, M, to silicon measured as $SiO_2$ in said reaction mixture is from about 0.05 to about 0.4, wherein the dominant structure directing agent cation can be suitable for formation of ZSM-48 under the effective synthesis conditions, wherein the secondary structure directing agent cation advantageously does not enable formation of ZSM-48 under the effective synthesis conditions, and wherein an amount of secondary structure directing agent cation $Q_2$ can be at least about 20 mol % of the combined amount of structure directing agent cation Q.

In another aspect, a method of synthesizing zeolite crystals is provided. The method can include crystallizing a reaction mixture to form zeolite crystals under effective synthesis conditions, the reaction mixture comprising a source of water, a source of silicon, a source of aluminum, a source of an alkali metal, M, a source of a dominant structure directing agent in the form of an organic cation $Q_1$, and a source of a secondary structure directing agent in the form of an organic cation $Q_2$, a combined amount of dominant structure directing agent cation $Q_1$ and secondary structure directing agent cation $Q_2$ corresponding to a combined amount of structure directing agent cation Q, wherein the dominant structure directing agent cation can be suitable for formation of the zeolite crystals under the effective synthesis conditions, wherein the secondary structure directing agent cation advantageously does not enable formation of the zeolite crystals under the effective synthesis conditions, the secondary structure directing agent comprising or being a tetraalkyl ammonium hydroxide, and wherein the amount of secondary structure directing agent cation $Q_2$ can be at least about 20 mol % of the combined amount of structure directing agent cation Q.

BRIEF DESCRIPTION OF THE FIGURES

FIG. 1 shows an XRD plot of ZSM-48 crystals synthesized according to the method in Example 5.

FIG. 2 shows an XRD plot of ZSM-48 crystals synthesized according to the method in Example 7.

FIG. 3 shows an XRD plot of ZSM-48 crystals synthesized according to the method in Example 9.

FIG. 4 shows SEM images of ZSM-48 crystals synthesized according to the method in Example 5.

FIG. 5 shows SEM images of ZSM-48 crystals synthesized according to the method in Example 7.

FIG. 6 shows SEM images of ZSM-48 crystals synthesized according to the method in Example 9.

FIGS. 7 and 8 show conversion and selectivity results from conversion of a decane feed exposed to various catalysts.

DETAILED DESCRIPTION OF THE EMBODIMENTS

Overview

In various aspects, methods are provided for synthesis of ZSM-48 crystals (or other types of zeolites or molecular sieves) using a synthesis mixture containing at least two structure directing agents. For a synthesis mixture having a specified composition under the synthesis conditions, a first structure directing agent can be a directing agent that enables formation of ZSM-48, or that enables formation of another desired zeolite or molecular sieve. A second structure directing agent can be a directing agent that enables formation of a molecular sieve different from ZSM-48 (or different from the other desired zeolite) under at least some synthesis conditions. Additionally, the second structure directing advantageously does not enable formation of ZSM-48 for the synthesis mixture having the specified composition under the synthesis conditions being used. In various aspects, the presence of the second structural directing agent may substantially not alter the structure and morphology of the molecular sieve crystals generated by the synthesis mixture. Instead, the synthesis mixture can generate ZSM-48 crystals based on the combined amount of directing agents present as if all (or at least substantially all) of the directing agent in the synthesis mixture corresponds to the first directing agent.

Dominant and Secondary Directing Agents

Methods described herein can be suitable for synthesis of various types of zeolites using synthesis mixtures that contain a dominant structure directing agent and one or more secondary structure directing agents that can substantially not alter the crystal structure and morphology of the crystals generated by a synthesis mixture in the presence of the dominant structure directing agent. It is noted that the dominant structure directing agent may represent a plurality of structure directing agents.

A dominant structure directing agent for forming a zeolite (or molecular sieve) of a given framework type is defined herein as a structure directing agent that, when used alone, induces formation of the zeolite (or molecular sieve) for a synthesis mixture having a specified ratio of reactants at a specified set of synthesis conditions. The specified ratio of reactants refers to the relative ratios of components that are typically expected in a synthesis mixture suitable for forming a molecular sieve or that have been observed to form a desired product material. For example, for a synthesis mixture suitable for forming an aluminosilicate zeolite, the ratios of the expected components in the synthesis mixture can include, but are not limited to, the ratio of silicon (measured as $SiO_2$) to hydroxyl ions; the ratio of silicon to aluminum (expressed herein as the ratio of silica to alumina); the ratio of silicon measured as silica to sodium and/or other alkali metals; the ratio of silicon measured as silica to water; and the ratio of silicon measured as silica to the total amount of structure directing agent or template. More generally, if a source of another tetravalent element is used in place of silicon and/or in addition to silicon, the ratios of expected components can include the ratio of tetravalent elements measured as oxides ($XO_2$) to hydroxyl ions; the ratio of tetravalent elements measured as oxides to trivalent elements measured as oxides ($X_2O_3$); the ratio of tetravalent elements measured as oxides to sodium or other alkali metals; the ratio of tetravalent elements measured as oxides to water; and the ratio of tetravalent elements measured as oxides to the total amount of structure directing agent or template. It is also noted that similar ratios can also be defined for synthesis mixtures that include sources of divalent elements (measured as oxides such as ZO) in the synthesis mixture.

A secondary structure directing agent for forming a zeolite (or molecular sieve) of a given framework type is defined herein as a structure directing agent that, when used alone, can be suitable for formation of a molecular sieve under at least some synthesis conditions. However, when the secondary structure directing agent is used as part of a synthesis mixture containing a dominant structure directing agent under synthesis conditions suitable for forming ZSM-48 (or another target molecular sieve that is enabled by the dominant structure directing agent), the secondary structure directing agent can advantageously substantially not alter the crystal structure and/or morphology of the crystals resulting from the synthesis mixture. Instead, the crystals can correspond to the crystals that would be expected based on generating molecular sieve crystals from a synthesis mixture containing an amount of the dominant structure directing agent corresponding to the total amount of all structure directing agents in the synthesis mixture under the synthesis conditions. In this definition, it is noted that a secondary structure directing agent is a directing agent effective as a template for forming a molecular sieve under a set of synthesis conditions, but not necessarily synthesis conditions similar to the conditions for the synthesis mixture where it is acting as a secondary directing agent. In some aspects, the secondary structure directing agent can be a structure directing agent that does not enable formation of ZSM-48 under any synthesis conditions. Alternatively, the secondary structure directing agent can be a structure directing agent that does not enable formation of the molecular sieve that is enabled by use of the dominant structure directing agent.

When determining the ratios of components within a synthesis mixture, the combined amount of dominant structure directing agent and secondary directing agent is used to determine the ratios, even though the secondary directing agent may not substantially impact the crystal structure and morphology. Typically this can be specified based on the molar amounts of the structure directing agent cations present in the synthesis mixture. This can allow a less expensive secondary structure directing agent and/or a secondary structure directing agent that can serve another purpose to be used in a synthesis mixture in place of a portion of the dominant structure directing agent. In various aspects, the amount of secondary structure directing agent cation in a synthesis mixture can be at least about 20 mol % of the combined amount of dominant structure directing agent cation and secondary structure directing agent cation in the synthesis mixture, such as at least about 25 mol % or at least about 30 mol %.

For example, some directing agents can also serve as a source of $OH^-$ ions in a synthesis mixture. An example of such a secondary directing agent is a tetraalkyl ammonium hydroxide. Tetraalkyl ammonium hydroxides are known as being suitable directing agents for formation of some types of molecular sieves, but can also typically be sufficiently basic to contribute to the OH⁻ concentration of a synthesis mixture. Thus, in addition to being a secondary structure directing agent, a tetraalkyl ammonium hydroxide can advantageously be used in place of at least a portion of another basic compound or source of hydroxyl ions, such as an alkali hydroxide. In some circumstances, it can be beneficial to reduce the concentration of alkali and/or alkaline earth elements, abbreviated as "alkali" herein for convenience (e.g., as hydroxides), as some impurity phases can be more likely to form with increasing alkali content. For example, increasing the amount of sodium in a synthesis mixture can increase the likelihood and/or amount of formation of Kenyaite (sodium silicate) from a synthesis mixture.

Using a tetraalkyl ammonium hydroxide as a secondary structure directing agent can allow for a reduction in the amount of sodium hydroxide in the synthesis mixture, thus reducing the likelihood of forming sodium silicate. In some aspects, a ratio of the amount of secondary structure directing agent to the amount of hydroxyl ions in a synthesis mixture can be at least about 1:10, for example at least about 1:9, at least about 1:8, or at least about 1:6. Additionally or alternately, the ratio of the amount of secondary structure directing agent to the amount of hydroxyl ions can be about 1:4 or less, for example about 1:5 or less.

For aspects related to synthesis of ZSM-48 (and/or other MRE framework zeolites as described in the zeolite database maintained by the International Zeolite Association), any convenient structure directing agent suitable for use in a synthesis mixture for formation of ZSM-48 can be used as a dominant structure directing agent. One option can be to use a diquaternary alkylammonium salt with a 6 carbon atom chain between the ammonium ions (a diquat-6). Another option can be to use a diquaternary alkylammonium salt with a 5 carbon atom chain between the ammonium ions (a diquat-5). Both diquat-5's and diquat-6's are known to be suitable as structure directing agents for formation of ZSM-48, although the resulting ZSM-48 crystals generated by diquat-5's and diquat-6's are typically different. It is believed that mixtures of diquat-5's and diquat-6's tend to produce ZSM-48 crystals having a crystal morphology corresponding roughly to the average of the crystal morphology that would be expected based on use of the individual structure directing agents in a reaction mixture. Therefore, under the definition of a dominant structure directing agent within this discussion, if more than one diquat-5 is present, if more than one diquat-6 is present, and/or if both diquat-5's and diquat-6's are present in a synthesis mixture, for example, the synthesis mixture can be defined as having multiple (more than one) dominant structure directing agents. In situations where multiple dominant structure directing agents are present, another structure directing agent that does not substantially impact the morphology and crystal structure would need to be present for such a synthesis mixture to have a secondary directing agent in the synthesis mixture.

As an additional and/or alternative example, a synthesis mixture can be formed that includes a dominant structure directing agent for forming a desired zeolite. The synthesis mixture can include a tetralkyl ammonium hydroxide as a secondary directing agent. This can allow for formation of a variety of zeolites where tetraalkyl ammonium hydroxide is useful as a secondary directing agent. Suitable zeolites where tetraalkyl ammonium hydroxides may be useful as a secondary directing agent can include, but are not limited to, a) zeolites where the largest pore sizes are from about 4.8 Angstroms to about 6.0 Angstroms; b) zeolites where the largest pore size corresponds to a 10 member ring or a 12 member ring; c) molecular sieves of framework type MRE, MTT, EUO, AEL, AFO, SFF, STF, or TON; d) molecular sieves of framework type OSI, ATO, GON, MTW, SFE, SSY, or VET; or e) combinations thereof. When "largest pore size" is used herein, as mentioned above, it should be understood that this refers to the largest pore size at or below 10.0 Angstroms, such that there may be pores in a material having sizes (meaning average diameters) larger than 10.0 Angstroms (e.g., mesopores), but those pores are summarily ignored and only pore sizes falling in the micropore range and no more than 10.0 Angstroms are considered for the purposes of evaluating the term "largest pore size" herein.

Synthesis Mixtures and Conditions

In this discussion, various examples may describe the use of sources of silicon (such as $SiO_2$), sources of aluminum (such as $Al_2O_3$), and sources of alkali for synthesis of zeolites. In the discussion herein, it should be understood that other crystals having a zeolite framework structure can generally be synthesized using other tetravalent elements in place of or in combination with silicon, such as tin, germanium, or a combination thereof; other trivalent elements in place of or in combination with aluminum, such as boron, indium, gallium, iron, or a combination thereof; and other alkali and/or alkaline earth elements in place of or in combination with sodium, such as potassium, magnesium, calcium, or a combination thereof. Thus, when a ratio of $SiO_2:Al_2O_3$ is described (silicon to aluminum, measured in terms of their various oxide forms), it should be understood that similar ratios of $XO_2:Y_2O_3$ (i.e., tetravalent elements to trivalent elements, again measured in terms of their various oxide forms) may additionally and/or alternatively be suitable for formation of a material having the corresponding zeolite framework structure.

In some aspects, the ZSM-48 crystals recovered from a reaction mixture can correspond to substantially pure ZSM-48 crystals. Substantially pure ZSM-48 crystals are defined herein as ZSM-48 crystals that contain less than about 10 wt % of another type of zeolite and/or impurity, such as ZSM-50 and/or Kenyaite. Preferably, the substantially pure ZSM-48 crystals can contain less than about 5 wt % of another type of zeolite/impurity, such as less than about 3 wt % or less than about 1 wt %.

In some aspects, the invention can relate to ZSM-48 crystals in a particular morphology, and a method of making the ZSM-48 composition. The ZSM-48 crystals can be can be "as-synthesized" crystals that still substantially contain the organic template(s), the crystals can be treated (calcined) product crystals, such as K/Na-form ZSM-48 crystals, and/or the crystals can be calcined and ion-exchanged crystals, such as H-form ZSM48 crystals. In some aspects, a synthesis mixture described as "free of non-ZSM-48 seed crystals" can be a reaction mixture used for forming the ZSM-48 that does not contain non-ZSM-48 seed crystals. In some aspects, ZSM-48 crystals synthesized according to the invention can be synthesized either without the use of seed crystals or with ZSM-48 seed crystals for seeding.

The X-ray diffraction pattern (XRD) of the ZSM-48 crystals according to the invention is that exhibited by ZSM-48, i.e., the d-spacings corresponding to the XRD peaks and their relative intensities correspond to those of pure ZSM-48. While XRD can be used to establish the identity of a given zeolite, it cannot typically be used to distinguish a particular morphology. For example, the needle-like and platelet forms for a given zeolite can typically exhibit the same diffraction patterns. In order to distinguish between different morphologies, it can be necessary to use an analytical tool with greater resolution. An example of such a tool is scanning electron microscopy (SEM), which generates photomicrographs that can be used to identify crystals with different morphologies.

In some aspects, a dominant structure directing agent and a secondary structure directing agent can be used for synthesis of ZSM-48 crystals. The ZSM-48 crystals after removal of the structural directing agent can have a particular morphology and a molar composition, measured as the oxide forms of the silicon and aluminum components, regardless of the nature of the sources of silicon and aluminum, according to the general formula: $(n)SiO_2:Al_2O_3$, where n can be from about 65 to about 110, for example from about 70 to about 100 or about 80 to about 95. In another aspect, n can be at least about 65, for example at least about 70, at least about 80, at least about 85, or at least about 90. Additionally or alternatively, n can be about 110 or less, for example about 100 or less or about 95 or less. Further additionally or alternatively, Si may be wholly or partially replaced by Ge and Al may be wholly or partially replaced by Ga, B, Fe, Ti, V, and/or Zr. More generally, the molar composition can include a ratio of $(n)SiO_2:Al_2O_3$ where n can be from about 50 to about 200.

The as-synthesized form of ZSM-48 crystals can be prepared from a mixture having silica (or another suitable silicon source), alumina (or another suitable aluminum source), base, a dominant structure directing agent, and a secondary structure directing agent. In an aspect, the molar ratio of the total amount of structure directing agent (both dominant and secondary) to the silicon source (measured/quantified as silica) in the mixture can be less than about 0.20, for example less than about 0.15, less than about 0.10, less than about 0.05, less than about 0.04, less than about 0.03, or less than about 0.025. Additionally or alternatively, the molar ratio of structural directing agent to the silicon source (measured/quantified as silica) in the mixture can be at least about 0.01, for example at least about 0.015 or at least about 0.016. Further additionally or alternatively, the molar ratio of structural directing agent to the silicon source (measured/quantified as silica) in the mixture can be from 0.015 to 0.04, for example from 0.02 to 0.035. Independently or in combination, the as-synthesized form of ZSM-48 crystals can have a silica:alumina molar ratio of about 65 to about 110. Additionally or alternatively, the as-synthesized form of ZSM-48 crystals can have a silica:alumina molar ratio of at least about 65, for example at least about 70, at least about 80, or at least about 85. Further additionally or alternatively, the as-synthesized form of ZSM-48 crystals can have a silica:alumina molar ratio of about 110 or less, for example about 100 or less or about 95 or less. It should be noted that the as-synthesized form of ZSM-48 crystals may have molar ratios different from the molar ratios of reactants of the reaction mixture used to prepare the as-synthesized form. This result may occur, for example, due to incomplete incorporation of 100% of the reactants of the reaction mixture into the crystals formed (from the reaction mixture).

In some aspects, the ZSM-48 zeolite in either calcined or as-synthesized form can form agglomerates of small crystals that may have crystal sizes in the range of about 0.01 µm to about 1 µm. These small crystals can be desirable in some embodiments, for they can generally lead to greater activity. Without being bound by theory, smaller crystals can mean greater surface area, which can in turn lead to a greater number of active catalytic sites per given amount of catalyst.

In some aspects, the ZSM-48 crystals in either calcined or as-synthesized form can have a morphology containing fibrous crystals. Fibrous crystals, as used herein, have an L/D ratio of >10/1, where L and D represent the length and diameter of the crystal. Depending on the aspect, at least about 10% of the crystals can be fibrous crystals, such as at least about 20%, at least about 30%, or at least about 40%. Additionally or alternatively, the ZSM-48 crystals can have a substantially fibrous crystal morphology, such as at least about 50% of the crystals, at least about 70%, or at least about 85%. The percentage of crystals having a morphology can be determined by counting based on, for example, SEM micrographs. Alternatively, the examination technique (such as SEM) can be used to determine that the volume of fibrous crystals corresponds to any of the above amounts. The resolution scale (1 µm) is shown on the SEM photomicrographs in the present Figures.

In additional or alternative aspects, at least a portion of the ZSM-48 crystals in either calcined or as-synthesized form can be needle-like crystals. Needle-like crystals, as used herein, have an L/D ratio of <10/1, for example less than 5/1, preferably between 3/1 and 5/1. Depending on the aspect, at least about 10% of the crystals can be needle-like morphology crystals, such as at least about 20%, at least about 30%, or at least about 40%. Additionally or alternatively, the ZSM-48 crystals can have a substantially needle-like crystal morphology, such as at least about 50% of the crystals, at least about 70%, or at least about 85%. The percentage of crystals having a morphology can be determined by counting based on, for example, SEM micrographs. Alternatively, the examination technique (such as SEM) can be used to determine that the volume of needle-like crystals corresponds to any of the above amounts.

In still further additional or alternative aspects, the ZSM-48 crystals in either calcined or as-synthesized form can include at least a combined amount of crystals having a fibrous crystal morphology and a needle-like crystal morphology. Depending on the aspect, the combined amount of crystals having a fibrous crystal morphology and a needle-like crystal morphology can be at least about 50% of the crystals, such as at least about 60% of the crystals, at least about 70%, or at least about 85%. The percentage of crystals having a morphology can be determined by counting based on, for example, SEM micrographs. Alternatively, the examination technique (such as SEM) can be used to determine that the combined volume of crystals having either fibrous or needle-like morphology can correspond to any of the above amounts. It is noted that the combined amount of crystals having a fibrous or needle-like morphology is explicitly contemplated as being combined with any of the individual amounts of fibrous crystal morphology and/or any of the individual amounts of needle-like crystal morphology combined above. Thus, in an exemplary aspect, the ZSM-48 crystals in either calcined or as-synthesized form can be at least about 50% of the crystals, such as at least about 60% of the crystals, at least about 70%, or at least about 85%. In such an exemplary aspect, the amount of fibrous crystals can be any of the above noted amounts, such as at least about 10%, at least about 20%, at least about 30%, at least about 40%, or at least about 50%, and/or the amount needle-like crystals can be any of the above noted amounts, such as at least about 10%, at least about 20%, at least about 30%, at least about 40%, or at least about 50%.

More generally, in the present method, a reaction mixture can be produced comprising a source of water, a source of (an oxide of) a tetravalent element, Y, such as selected from at least one of silicon, tin, titanium, vanadium, and germanium, a source of (an oxide of) a trivalent element, X, such as selected from at least one of aluminum, boron, gallium, iron, and chromium, a source of an alkali and/or alkaline earth metal (preferably not including sodium), M, together with a source of two or more directing agents, collectively Q. Regardless of whether the sources of elements X, Y, M, and the like, are in oxide form, their proportions are typically described as if in their oxide form. Generally, the composition of the reaction mixture can be controlled so that the molar ratio $Q/YO_2$ in said reaction mixture is in the range from about 0.01 to about 0.10, for example from about 0.01 to about 0.05, from about 0.01 to about 0.03, or from about 0.015 to about 0.025. Additionally or alternately, the composition of the reaction mixture can be controlled by selecting one or more of the following molar ratios: $YO_2/X_2O_3$ from about 50 to about 200, for example from about 50 to about 150, from about 50 to about 120, from about 50 to about 110, from about 60 to about 150, from about 60 to about 120, from about 60 to about 110, from about 65 to about 150, from about 65 to about 120, or from about 65 to about 110; $H_2O/YO_2$ from about 1 to about 500, e.g., from about 5 to about 200, from about 5 to about 150, from about 5 to about 100, from about 5 to about 50, from about 5 to about 35, from about 10 to about 200, from about 10 to about 150, from about 10 to about 100, from about 10 to about 50, from about 10 to about 35, from about 14 to about 200, from about 14 to about 150, from about 14 to about 100, from about 14 to about 50, or from about 14 to about 35; $OH^-/YO_2$ from about 0.1 to about 0.3, e.g., from about 0.1 to about 0.25, from about 0.1 to about 0.2, from about 0.1 to about 0.18, from about 0.14 to about 3, from about 0.14 to about 0.25, from about 0.14 to about 0.2, or from about 0.14 to about 0.18; and $M/YO_2$ from about 0.05 to about 0.5, e.g., from about 0.05 to about 0.4, from about 0.05 to about 0.35, from about 0.05 to about 0.3, from about 0.05 to about 0.25, from about 0.10 to about 0.5, from about 0.10 to about 0.4, from about 0.10 to about 0.3, from about 0.10 to about 0.25, from about 0.15 to about 0.5, from about 0.15 to about 0.4, from about 0.15 to about 0.3, or from about 0.15 to about 0.25. It should be noted that, although molar ratios of $OH^-/YO_2$ are used throughout this description, it should be understood that such molar ratios are meant to encompass whatever the chemical nature of the non-detrimental counterions of M and Q, and are only expressed herein as $OH^-/YO_2$ because hydroxyl counterions were specifically used, not to unduly limit. Similarly, where specific examples of Y, X, M, and Q are mentioned herein in molar ratios, their ranges should be understood to extend generically to the variable, unless expressly disclaimed, and not necessarily merely limited to the individual species of the variable genus.

The silicon source can advantageously include or be a precipitated silica such as Ultrasil™ or HiSil™ such as commercially available from Evonik Degussa or PPG Industries. Other silica sources can include powdered silica, including precipitated silica such as Zeosil™ and silica gels, silicic acid, colloidal silica such as Ludox™, dissolved silica, or the like, or combinations thereof. In the presence of a base, these non-precipitated silica sources may form silicates. The alumina may be in the form of a soluble salt, and can advantageously be a salt that includes little or no sodium. Suitable aluminum sources can include, but are not limited to, aluminum salts such as the chloride, aluminum alcoholates, hydrated aluminas such as gamma alumina, pseudobohemite, and/or colloidal alumina, as well as combinations thereof. The base used to dissolve the oxide form can be any alkali hydroxide (such as sodium hydroxide, lithium hydroxide, or potassium hydroxide), ammonium hydroxide, alkaline earth hydroxide, diquaternary hydroxide, or the like. In some aspects, a portion of the base can be sodium hydroxide while a second portion can be an alkali hydroxide different from sodium. In some aspects, a portion of the base can be sodium hydroxide and/or another hydroxide described above, while a second portion can be a hydroxide that can also serve as a secondary structure directing agent.

In various aspects, the dominant structure directing agent can be a salt based on a diquaternary ammonium cation. In particular, the cation portion of the salt can be represented by the formula $R_1—R_3—R_2$, where $R_1$ and $R_2$ are the same or different. $R_1$ and $R_2$ can be tetraalkylammonium groups such that the above formula amounts to $RR'R''—N^+—R_3—N^+—RR'R''$, wherein each R, R', and R'' can independently be alkyl groups and can each be the same or different. The R, R', and R'' alkyl groups on a tetraalkylammonium group can each be an alkyl group having from 1 to 10 carbons, and preferably 4 carbons or less, such as a methyl group or an ethyl group. In some aspects, $R_3$ can be a polymethylene group of formula $(CH_2)_n$, where n=6. This type of cation can be referred to as a "diquat-6" cation. One example of a diquat-6 cation is a hexamethammonium cation, where $R_1$ and $R_2$ are the same, and each R, R', and R'' is a methyl group. The anion portion of the diquat-6 salt can be chloride or other anion such as hydroxide, nitrate, sulfate, other halide and the like. For example the anion portion can be a dihalide. For example, hexamethonium chloride is N,N,N, N',N',N'-hexamethyl-1,6-hexanediammonium dichloride. In other aspects, $R_3$ can be a polymethylene group of formula $(CH_2)_n$, where n=5. This type of cation can be referred to as a "diquat-5" cation.

The secondary structure directing agent can be any convenient compound capable of acting as a structure directing agent under some synthesis conditions, but that can advantageously substantially not alter the crystal structure and/or morphology when included in a synthesis mixture that also contains a dominant structure directing agent under a specified set of synthesis conditions. One example of a suitable secondary structure directing agent is a tetraalkyl ammonium hydroxide, such as tetramethyl ammonium hydroxide or tetraethyl ammonium hydroxide. Other alkyl groups can additionally or alternately be used, such as with propyl and/or butyl groups. Optionally, the alkyl groups of the tetraalkyl ammonium hydroxide can be different from one another, such as using at least one methyl and at least one ethyl, at least one ethyl and at least one propyl, or any other type of convenient combination of alkyl groups.

In some syntheses of the ZSM-48 crystals, the reactants can include silicate salt, aluminate salt, base, and directing agent, mixed together with water in the ratios set forth above and heated with stirring at about 100° C. to about 250° C. The crystals may be formed from reactants without seeding or, in the alternative, ZSM-48 seed crystals may be added to the reaction mixture. The ZSM-48 seed crystals may be added to enhance the rate of crystal formation but typically do not otherwise affect crystal morphology. The ZSM-48 crystals can be purified, such as by filtration, and washed with deionized water and/or other liquid media, repeatedly if necessary.

In various aspects, the crystals obtained from the synthesis according to the invention can advantageously have a composition free of non ZSM-48 seed crystals and free of ZSM-50. In various aspects, the ZSM-48 crystals can have a low quantity of Kenyaite. For example, the amount of Kenyaite can be 5% or less, 2% or less, or 1% or less. In an alternative aspect, the ZSM-48 crystals can be substantially free or completely free of detectable Kenyaite.

The as-synthesized ZSM-48 crystals can typically be at least partially dried prior to use or further treatment. Drying may be accomplished by heating, for example, at temperatures from 100° C. to 400° C., such as from 100° C. to 250° C. Pressures may be atmospheric or subatmospheric. If drying is performed under partial vacuum conditions, the temperatures may be lower than those at atmospheric pressures.

Catalysts can sometimes be bound with binder and/or matrix materials prior to use. Binders can be resistant to temperatures of the use desired and are typically attrition resistant. Binders may be catalytically active or inactive and can include other zeolites, other inorganic materials such as clays and metal oxides such as alumina, silica and silica-alumina. Clays may include or be kaolin, bentonite, montmorillonite, or the like, or combinations thereof, and are typically commercially available. They may be blended with other materials such as silicates. Other binary porous matrix materials, in addition to silica-aluminas, can include materials such as silica-magnesia, silica-thoria, silica-zirconia, silica-beryllia, and silica-titania, inter alia. Ternary materials such as silica-alumina-magnesia, silica-alumina-thoria, and silica-alumina-zirconia can also be suitable for use as binders. The matrix can be in the form of a co-gel. Bound ZSM-48, for example, may range from 10 to less than 100 wt % ZSM-48, based on bound ZSM-48 with the balance being binder.

ZSM-48 crystals as part of a catalyst may additionally or alternatively be used with a metal hydrogenation component. Metal hydrogenation components may be from Groups 6-12 of the Periodic Table based on the IUPAC system having Groups 1-18, for example being drawn from Groups 6 and 8-10. Examples of such metals can include Ni, Mo, Co, W, Mn, Cu, Zn, Ru, Pt, and/or Pd, for example Pt or Pd. Mixtures of hydrogenation metals may also be used such as Co/Mo, Ni/Mo, Ni/W, and Pt/Pd, for example Pt/Pd. The amount of hydrogenation metal or metals may range from about 0.1 wt % to about 30 wt %, based on catalyst. For example, the amount of hydrogenation metals can be at least about 0.1 wt %, at least about 0.3 wt %, at least about 0.5 wt %, at least about 0.75 wt %, at least about 1.0 wt %, at least about 1.5 wt %, at least about 2 wt %, or at least about 5 wt %. Additionally or alternately, the amount of hydrogenation metals can be about 30 wt % or less, such as about 20 wt % or less, about 15 wt % or less, about 10 wt % or less, about 5 wt % or less, or about 2 wt % or less. In aspects where the hydrogenation metal(s) are selected to be one or more noble metals (such as Pt and/or Pd), the amount of hydrogenation metals can preferably be about 2 wt % or less, such as about 1.5 wt % or less or about 1.0 wt % or less. Methods of loading metal onto ZSM-48 catalyst are well known and can include, for example, impregnation of ZSM-48 catalyst with a metal salt of the hydrogenation component and heating. The ZSM-48 catalyst containing hydrogenation metal may be sulfided and/or steamed prior to use.

The ZSM-48 crystals can have an Alpha value of at least about 10, for example at least about 20 or at least about 30. Additionally or alternately, the alpha value can be about 250 or less. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

To the extent desired, the original cations of the as-synthesized material, such as alkali cations, can be replaced in accordance with techniques well known in the art, at least in part, by ion exchange with other cations. Preferred replacing cations can include metal ions, hydrogen ions, hydrogen precursor, e.g., ammonium ions and mixtures thereof. Particularly preferred cations can be those which tailor the catalytic activity for certain hydrocarbon conversion reactions. These can include hydrogen, rare earth metals, and metals of Groups IIA, IIIA, IVA, VA, IB, IIB, IIIB, IVB, VB, VIB, VIIB, and/or VIII of the Periodic Table of the Elements.

The crystalline material of this invention, when employed as an adsorbent and/or as a catalyst in an organic compound conversion process, can be dehydrated at least partially. This can be done, for instance, by heating to a temperature in the range of about 200° C. to about 370° C. in an atmosphere such as air/nitrogen, at atmospheric, subatmospheric, or superatmospheric pressures for between about 30 minutes and about 48 hours. Dehydration can additionally or alternatively be performed, for example, at room temperature (~20-25° C.) merely by placing the ZSM-48 in a vacuum, but a longer time may be required to obtain a sufficient amount of dehydration that way.

Optionally, additionally or alternatively, the crystals can be calcined at a temperature of about 350° C. to about 925° C. for about 1 minute to about 20 minutes. To reach the calcination temperature, the temperature of the oven or other device for heating the crystals can be raised continuously or in increments of 50° C., 100° C., or another convenient increment. If incrementally, the crystals can be held at the incremental temperatures for a period of time prior to continuing to increase the temperature to the desired final calcination temperature. The incremental heating can allow water vapor to exit the crystal structure while reducing or minimizing damage and/or morphology changes in the crystals.

The above text describes synthesis of ZSM-48 as an example of the more general methodology for forming zeolites using a dominant structure directing agent and a secondary structure directing agent. Although ZSM-48 is explicitly discussed, those of skill in the art will understand that the synthesis methods for a variety zeolites are known in the art. Such known synthesis procedures can be readily adapted to make use of a dominant structure directing agent and a secondary structure directing agent as described herein.

The crystalline molecular sieve(s) produced by the present process can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of a temperature from about 250° C. to about 500° C., a pressure from about 0 psig to 500 psi, (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 $hr^{-1}$ to about 10 $hr^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 $hr^{-1}$ to about 20 $hr^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 $hr^{-1}$ to about 500 $hr^{-1}$; and (m) a hydrocarbon trap (e.g., pre-catalytic converter adsorbent) for cold start emissions in motor vehicles.

OTHER EMBODIMENTS

Additionally or alternately, the present invention can include one or more of the following embodiments.

Embodiment 1

A method of synthesizing zeolite crystals, the method comprising: crystallizing a reaction mixture to form zeolite crystals under effective synthesis conditions, the reaction mixture comprising a source of water, a source of $SiO_2$, a source of $Al_2O_3$, a source of an alkali metal, M, a source of a dominant structure directing agent in the form of an organic cation $Q_1$, and a source of a secondary structure directing agent in the form of an organic cation $Q_2$, a combined amount of dominant structure directing agent cation $Q_1$ and secondary structure directing agent cation $Q_2$ corresponding to a combined amount of structure directing agent cation Q, where the dominant structure directing agent cation is suitable for formation of the zeolite crystals under the effective synthesis conditions, where the secondary structure directing agent cation does not enable formation of the zeolite crystals under the effective synthesis conditions, the secondary structure directing agent being a tetraalkyl ammonium hydroxide, and where the amount of secondary structure directing agent cation $Q_2$ is at least about 20 mole % of the combined amount of structure directing agent cation Q.

Embodiment 2

The method of Embodiment 1, wherein a) the zeolite crystals have a largest pore size from about 4.8 Angstroms to about 6.0 Angstroms; b) the zeolite crystals have a largest pore size that corresponds to a 10 member ring or a 12 member ring; c) the zeolite crystals have a framework type of MRE, MTT, EUO, AEL, AFO, SFF, STF, or TON; d) the zeolite crystals have a framework type of OSI, ATO, GON, MTW, SFE, SSY, or VET; or e) a combination thereof.

Embodiment 3

The method of Embodiment 1, wherein a) the zeolite crystals have a largest pore size from about 4.8 Angstroms to about 6.0 Angstroms; b) the zeolite crystals have a largest pore size that corresponds to a 10 member ring; or e) a combination thereof.

Embodiment 4

The method of Embodiment 1, wherein the zeolite crystals are selected from ZSM-23, ZSM-48, or combinations thereof, the zeolite crystals preferably being ZSM-48 crystals.

Embodiment 5

The method of any of the above embodiments, wherein the reaction mixture further comprises seeds of the zeolite crystals in an amount such that a weight percent of seeds relative to total weight of SiO$_2$ in said reaction mixture is between about 0.1 wt % and about 20 wt %.

Embodiment 6

A method of synthesizing ZSM-48 crystals, the method comprising: crystallizing a reaction mixture to form ZSM-48 crystals under effective synthesis conditions, the reaction mixture comprising a source of water, a source of SiO$_2$, a source of Al$_2$O$_3$, a source of an alkali metal, M, a source of a dominant structure directing agent in the form of an organic cation Q$_1$, and a source of a secondary structure directing agent in the form of an organic cation Q$_2$, a combined amount of dominant structure directing agent cation Q$_1$ and secondary structure directing agent cation Q$_2$ corresponding to a combined amount of structure directing agent cation Q, the reaction mixture having a molar ratio of combined structure directing agent cation Q to SiO$_2$ in said reaction mixture of about 0.01 to about 0.20, or about 0.01 to about 0.10, or about 0.015 to about 0.04; a molar ratio of SiO$_2$ to Al$_2$O$_3$ in said reaction mixture of about 50 to about 200; a molar ratio of water to SiO$_2$ in said reaction mixture of about 1 to about 500; a molar ratio of hydroxyl group concentration to SiO$_2$ in said reaction mixture is from about 0.1 to about 0.3; and a molar ratio of alkali metal, M, to SiO$_2$ in said reaction mixture is from about 0.05 to about 0.4, where the dominant structure directing agent cation is suitable for formation of ZSM-48 under the effective synthesis conditions, where the secondary structure directing agent cation does not enable formation of ZSM-48 under the effective synthesis conditions, and where an amount of secondary structure directing agent cation Q$_2$ is at least about 20 mole % of the combined amount of structure directing agent cation Q.

Embodiment 7

The method of Embodiment 6, wherein the reaction mixture further comprises seeds of ZSM-48 in an amount such that a weight percent of seeds relative to total weight of SiO$_2$ in said reaction mixture is between about 0.1 wt % and about 20 wt %

Embodiment 8

The method of Embodiment 6 or 7, wherein at least 50 vol % of the as-synthesized ZSM-48 crystals have a fibrous morphology.

Embodiment 9

The method of Embodiment 6 or 7, wherein at least 50 vol % of the as-synthesized ZSM-48 crystals have a needle-like morphology.

Embodiment 10

The method of any of the above embodiments, wherein the dominant structure directing agent cation is diquat-5, diquat-6, or a combination thereof.

Embodiment 11

The method of any of the above embodiments, wherein the secondary structure directing agent is tetramethyl ammonium hydroxide, tetraethyl ammonium hydroxide, tetrapropyl ammonium hydroxide, tetrabutyl ammonium hydroxide, or a combination thereof.

Embodiment 12

The method of Embodiment 11, wherein the secondary structure directing agent cation is tetraethyl ammonium.

Embodiment 13

The method of any of the above embodiments, wherein a molar ratio of the amount of secondary structure directing agent Q$_2$ to the amount of hydroxyl ions is at least about 1:10.

Embodiment 14

The method of any of the above embodiments, wherein the amount of secondary structure directing agent cation Q$_2$ is at least about 25 mole % of the combined amount of structure directing agent cation Q.

Embodiment 15

The method of any of Embodiments 6 to 14, wherein the reaction mixture has a molar ratio of combined structure directing agent cation Q to SiO$_2$ in said reaction mixture of about 0.01 to about 0.05; a molar ratio of SiO$_2$ to Al$_2$O$_3$ in said reaction mixture of about 50 to about 150; a molar ratio of water to SiO$_2$ in said reaction mixture of about 1 to about 500; a molar ratio of hydroxyl group concentration to SiO$_2$ in said reaction mixture is from about 0.1 to about 0.3; and a molar ratio of alkali metal, M, to SiO$_2$ in said reaction mixture is from about 0.05 to about 0.4

Embodiment 16

The method of any of Embodiments 6 to 15, wherein the molar ratio of SiO$_2$ to Al$_2$O$_3$ in said reaction mixture is about 65 to about 120.

EXAMPLES

In the following, Examples 1-9 correspond to ZSM-48 crystals that were synthesized from synthesis mixtures containing both a dominant structure directing agent and a secondary structure directing agent. In the tables specifying the synthesis mixture ratios, the structure directing agent is abbreviated as SDA. The dominant structure directing agent in each of the synthesis mixtures in Examples 1-9 comprises hexamethonium chloride, which corresponds to the chloride salt of diquat-6. The secondary structure directing agent comprises a tetraalkylammonium hydroxide as specified in each example. In Example 10, the synthesis mixture contained only hexamethonium dihydroxide as a structure directing agent.

The total BET surface area and the t-Plot (micropore) surface area in the Examples below were measured with a Micromeretics Tristar™ II 3020 instrument after degassing of the calcined products for about 4 hours at about 350° C. The external surface areas were obtained by the subtraction of the micropore from the total BET surface area. More information regarding the method can be found, for example, in "Characterization of Porous Solids and Powders: Surface Area, Pore Size and Density", S. Lowell et al., Springer, 2004.

Example 1—Preparation of ZSM-48 Using a Mixture of Hexamethonium Chloride and Tetramethyl Ammonium Hydroxide (TMAOH)

A mixture was prepared from about 9.8 kg of water, about 380 g of Hexamethonium Chloride (~56% solution), about 2.57 kg of Ultrasil™ silica, about 195 g of sodium aluminate solution (~43%), about 180 g of ~25% TMAOH solution, about 20 g of ZSM-48 seeds, and about 280 g of ~50% sodium hydroxide solution. The mixture had the following molar composition.

TABLE 1

| Reactants | Molar ratio |
|---|---|
| $SiO_2:Al_2O_3$ | ~82 |
| $H_2O:SiO_2$ | ~15 |
| $OH^-:SiO_2$ | ~0.17 |
| $Na^+:SiO_2$ | ~0.12 |
| Dominant $SDA:SiO_2$ | ~0.02 |
| Secondary $SDA:SiO_2$ | ~0.01 |

The mixture was reacted at about 320° F. (~160° C.) in a ~5-gallon autoclave with stirring at ~250 RPM for about 48 hours. The product was filtered, washed with deionized (DI) water, and dried at ~250° F. (~120° C.). The XRD pattern of the as-synthesized material showed the typical pure phase of ZSM-48 topology. The SEM of the as-synthesized material showed that the material was composed of agglomerates of small irregularly shaped crystals. The resulting ZSM-48 crystals had a $SiO_2/Al_2O_3$ molar ratio of ~80/1. The as-synthesized crystals were converted into the hydrogen form by three ion exchanges with ammonium nitrate solution at room temperature (~20-25° C.), followed by drying at ~250° F. (~120° C.) and calcination at ~1000° F. (~540° C.) for about 6 hours. The resulting H-ZSM-48 crystals had an Alpha value of about 110, a hexane sorption of about 43.3 mg/g, and a surface area of about 301 $m^2/g$, which included about 175 $m^2/g$ of microporous surface area and about 126 $m^2/g$ of external surface area.

Example 2: Preparation of ZSM-48 Using Hexamethonium Chloride and Tetraethyl Ammonium Hydroxide (TEAOH)

A mixture was prepared from about 9.8 kg of water, about 400 g of Hexamethonium Chloride (~56% solution), about 2.57 kg of Ultrasil™ silica, about 195 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 2

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+:SiO_2$ | ~0.02 |
| Dominant $SDA:SiO_2$ | ~0.02 |
| Secondary $SDA:SiO_2$ | ~0.01 |

The mixture was reacted at ~320° F. (~160° C.) in a ~5-gallon autoclave with stirring at ~250 RPM for about 48 hours. The product was filtered, washed with deionized (DI) water, and dried at ~250° F. (~120° C.). The XRD pattern of the as-synthesized material showed the typical pure phase of ZSM-48 topology. The SEM of the as-synthesized material showed that the material was composed of agglomerates of small crystals. The resulting ZSM-48 crystals had a $SiO_2/Al_2O_3$ molar ratio of ~77. The as-synthesized crystals were converted into the hydrogen form by three ion exchanges with ammonium nitrate solution at room temperature (~20-25° C.), followed by drying at ~250° F. (~120° C.), and calcination at 1000° F. (~540° C.) for about 6 hours. The resulting H-ZSM-48 crystals had an Alpha value of about 130, a hexane sorption of about 48.5 mg/g, and a surface area of about 308 $m^2/g$, which included about 195 $m^2/g$ of microporous surface area and about 113 $m^2/g$ of external surface area.

Example 3: Preparation of ZSM-48 Using Hexamethonium Chloride and Tetraethyl Ammonium Hydroxide (TEAOH)

A mixture was prepared from about 9.8 kg of water, about 440 g of Hexamethonium Chloride (~56% solution), about 2.57 kg of Ultrasil™ silica, about 195 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 3

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+:SiO_2$ | ~0.13 |
| Dominant $SDA:SiO_2$ | ~0.022 |
| Secondary $SDA:SiO_2$ | ~0.01 |

The mixture was reacted at ~320° F. (~160° C.) in a ~5-gallon autoclave with stirring at ~250 RPM for about 48 hours. The product was filtered, washed with deionized (DI) water, and dried at ~250° F. (~120° C.). The XRD pattern of the as-synthesized material showed the typical pure phase of ZSM-48 topology. The SEM of the as-synthesized material shows that the material was composed of agglomerates of small crystals. The resulting ZSM-48 crystals had a $SiO_2/Al_2O_3$ molar ratio of ~76. The as-synthesized crystals were converted into the hydrogen form by three ion exchanges with ammonium nitrate solution at room temperature (~20-25° C.), followed by drying at ~250° F. (~120° C.), and calcination at 1000° F. (~540° C.) for ~6 hours. The resulting H-ZSM-48 crystals had an Alpha value of about 130, a hexane sorption of about 47.3 mg/g, and a surface area of about 322 $m^2/g$, which included about 209 $m^2/g$ of microporous surface area and about 113 $m^2/g$ of external surface area.

Example 4: Preparation of ZSM-48 Using Hexamethonium Chloride and Tetraethyl Ammonium Hydroxide (TEAOH)

A mixture was prepared from about 9.8 kg of water, about 520 g of Hexamethonium Chloride (~56% solution), about 2.57 kg of Ultrasil™ silica, about 195 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 4

| Reactants | Molar ratio |
| --- | --- |
| $SiO_2:Al_2O_3$ | ~82 |
| $H_2O:SiO_2$ | ~15 |
| $OH^-:SiO_2$ | ~0.15 |
| $Na^+:SiO_2$ | ~0.13 |
| Dominant SDA:$SiO_2$ | ~0.026 |
| Secondary SDA:$SiO_2$ | ~0.01 |

The mixture was reacted at ~320° F. (~160° C.) in a ~5-gallon autoclave with stirring at ~250 RPM for ~48 hours. The product was filtered, washed with deionized (DI) water, and dried at ~250° F. (~120° C.). The XRD pattern of the as-synthesized material showed the typical ZSM-48 topology with trace of ZSM-50 impurity. The SEM of the as-synthesized material showed that the material was composed of agglomerates of small crystals. The resulting ZSM-48 crystals had a $SiO_2/Al_2O_3$ molar ratio of ~77. The as-synthesized crystals were converted into the hydrogen form by three ion exchanges with ammonium nitrate solution at room temperature (~20-25° C.), followed by drying at ~250° F. (~120° C.), and calcination at ~1000° F. (~540° C.) for ~6 hours. The resulting H-ZSM-48 crystals had an Alpha value of about 150, a hexane sorption of about 50.8 mg/g, and surface area of about 339 $m^2/g$, which included about 233 $m^2/g$ of microporous surface area and about 106 $m^2/g$ of m or external surface area.

Example 5: Preparation of ZSM-48 Using Hexamethonium Chloride and Tetraethyl Ammonium Hydroxide (TEAOH)

A mixture was prepared from about 9.8 kg of water, about 360 g of Hexamethonium Chloride (~56% solution), about 2.57 kg of Ultrasil™ silica, about 195 g of sodium aluminate solution (~43%), about 320 g of ~35% TEAOH solution, about 20 g of ZSM-48 seeds, and about 300 g of ~50% sodium hydroxide solution. The mixture had the following molar composition.

TABLE 5

| Reactants | Molar ratio |
| --- | --- |
| $SiO_2:Al_2O_3$ | ~82 |
| $H_2O:SiO_2$ | ~15 |
| $OH^-:SiO_2$ | ~0.15 |
| $Na^+:SiO_2$ | ~0.13 |
| Dominant SDA:$SiO_2$ | ~0.018 |
| Secondary SDA:$SiO_2$ | ~0.02 |

The mixture was reacted at ~320° F. (~160° C.) in a ~5-gallon autoclave with stirring at ~250 RPM for ~48 hours. The product was filtered, washed with deionized (DI) water, and dried at ~250° F. (~120° C.). The XRD pattern of the as-synthesized material showed the typical pure phase of ZSM-48 topology, as shown in FIG. 1. The SEM of the as-synthesized material, as shown in FIG. 4, shows that the material was composed of agglomerates of small crystals. The resulting ZSM-48 crystals had a $SiO_2/Al_2O_3$ molar ratio of ~76. The as-synthesized crystals were converted into the hydrogen form by three ion exchanges with ammonium nitrate solution at room temperature (~20-25° C.), followed by drying at ~250° F. (~120° C.), and calcination at ~1000° F. (~540° C.) for ~6 hours. The resulting H-ZSM-48 crystals had an Alpha value of about 140, a hexane sorption of about 49.4 mg/g, and a surface area of about 309 $m^2/g$, which included about 176 $m^2/g$ of microporous surface area and about 133 $m^2/g$ of external surface area.

Example 6: Preparation of ZSM-48 Using Hexamethonium Chloride and Tetraethyl Ammonium Hydroxide (TEAOH)

A mixture was prepared from about 9.8 kg of water, about 400 g of Hexamethonium Chloride (~56% solution), about 2.57 kg of Ultrasil™ silica, about 210 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 6

| Reactants | Molar ratio |
| --- | --- |
| $SiO_2:Al_2O_3$ | ~76 |
| $H_2O:SiO_2$ | ~15 |
| $OH^-:SiO_2$ | ~0.15 |
| $Na^+:SiO_2$ | ~0.13 |
| Dominant SDA:$SiO_2$ | ~0.02 |
| Secondary SDA:$SiO_2$ | ~0.01 |

The mixture was reacted at ~320° F. (~160° C.) in a ~5-gallon autoclave with stirring at ~250 RPM for ~48 hours. The product was filtered, washed with deionized (DI) water, and dried at ~250° F. (~120° C.). The XRD pattern of the as-synthesized material showed the typical pure phase of ZSM-48 topology. The SEM of the as-synthesized material shows that the material was composed of agglomerates of small crystals. The resulting ZSM-48 crystals had a $SiO_2/Al_2O_3$ molar ratio of ~69. The as-synthesized crystals were converted into the hydrogen form by three ion exchanges with ammonium nitrate solution at room temperature (~20-25° C.), followed by drying at ~250° F. (~120° C.), and calcination at 1000° F. (~540° C.) for ~6 hours. The resulting H-ZSM-48 crystals had an Alpha value of about 150, a hexane sorption of about 48.9 mg/g, and a surface area of about 328 $m^2/g$, which included about 170 $m^2/g$ of microporous surface area and about 158 $m^2/g$ of external surface area.

Example 7: Preparation of ZSM-48 Using Hexamethonium Chloride and Tetraethyl Ammonium Hydroxide (TEAOH)

A mixture was prepared from about 9.8 kg of water, about 400 g of Hexamethonium Chloride (~56% solution), about 2.57 kg of Ultrasil™ silica, about 210 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 7

| Reactants | Molar ratio |
| --- | --- |
| $SiO_2:Al_2O_3$ | ~76 |
| $H_2O:SiO_2$ | ~15 |
| $OH^-:SiO_2$ | ~0.16 |
| $Na^+:SiO_2$ | ~0.13 |
| Dominant SDA:$SiO_2$ | ~0.02 |
| Secondary SDA:$SiO_2$ | ~0.01 |

The mixture was reacted at ~330° F. (~166° C.) in a ~5-gallon autoclave with stirring at ~250 RPM for ~36 hours. The product was filtered, washed with deionized (DI) water, and dried at ~250° F. (~120° C.). The XRD pattern of the as-synthesized material showed the typical pure phase of ZSM-48 topology, as shown in FIG. 2. The SEM of the as-synthesized material shows that the material, as shown in FIG. 5, was composed of agglomerates of small crystals. The resulting ZSM-48 crystals had a $SiO_2/Al_2O_3$ molar ratio of ~71. The as-synthesized crystals were converted into the hydrogen form by three ion exchanges with ammonium nitrate solution at room temperature (~20-25° C.), followed by drying at ~250° F. (~120° C.), and calcination at ~1000° F. (~540° C.) for ~6 hours. The resulting H-ZSM-48 crystals had an Alpha value of about 150, a hexane sorption of less than about 50.3 mg/g, and a surface area of about 324 $m^2/g$, which included about 176 $m^2/g$ of microporous surface area and about 148 $m^2/g$ of external surface area.

Example 8: Preparation of ZSM-48 Using Hexamethonium Chloride and Tetraethyl Ammonium Hydroxide (TEAOH)

A mixture was prepared from about 9.8 kg of water, about 400 g of Hexamethonium Chloride (~56% solution), about 2.57 kg of Ultrasil™ silica, about 210 g of sodium aluminate solution (~43%), about 160 g of ~35% TEAOH solution, about 20 g of ZSM-48 seeds, and about 300 g of ~50% sodium hydroxide solution. The mixture had the following molar composition.

TABLE 8

| Reactants | Molar ratio |
| --- | --- |
| $SiO_2:Al_2O_3$ | ~76 |
| $H_2O:SiO_2$ | ~15 |
| $OH^-:SiO_2$ | ~0.16 |
| $Na^+:SiO_2$ | ~0.13 |
| Dominant SDA:$SiO_2$ | ~0.02 |
| Secondary SDA:$SiO_2$ | ~0.01 |

The mixture was reacted at ~340° F. (~170° C.) in a ~5-gallon autoclave with stirring at ~250 RPM for ~36 hours. The product was filtered, washed with deionized (DI) water, and dried at ~250° F. (~120° C.). The XRD pattern of the as-synthesized material showed the typical pure phase of ZSM-48 topology. The SEM of the as-synthesized material shows that the material was composed of agglomerates of small crystals. The resulting ZSM-48 crystals had a $SiO_2/Al_2O_3$ molar ratio of ~70.

Example 9: Preparation of ZSM-48 Using Hexamethonium Chloride and Tetraethyl Ammonium Hydroxide (TEAOH)

A mixture was prepared from about 9.8 kg of water, about 360 g of Hexamethonium Chloride (~56% solution), about 2.57 kg of Ultrasil™ silica, about 195 g of sodium aluminate solution (~43%), about 320 g of ~35% TEAOH solution, about 20 g of ZSM-48 seeds, and about 300 g of ~50% sodium hydroxide solution. The mixture had the following molar composition.

TABLE 9

| Reactants | Molar ratio |
| --- | --- |
| $SiO_2:Al_2O_3$ | ~76 |
| $H_2O:SiO_2$ | ~15 |

TABLE 9-continued

| Reactants | Molar ratio |
| --- | --- |
| $OH^-:SiO_2$ | ~0.15 |
| $Na^+:SiO_2$ | ~0.13 |
| Dominant SDA:$SiO_2$ | ~0.018 |
| Secondary SDA:$SiO_2$ | ~0.02 |

The mixture was reacted at ~340° F. (~170° C.) in a ~5-gallon autoclave with stirring at ~250 RPM for ~24 hours. The product was filtered, washed with deionized (DI) water, and dried at ~250° F. (~120° C.). The XRD pattern of the as-synthesized material showed the typical pure phase of ZSM-48 topology, as shown in FIG. 3. The SEM of the as-synthesized material, as shown in FIG. 6, showed that the material was composed of agglomerates of small crystals. The resulting ZSM-48 crystals had a $SiO_2/Al_2O_3$ molar ratio of ~69.

Comparative Example 10

Attempted Synthesis of ZSM-48 from Hexamethonium Dihydroxide

A mixture was prepared from about 1.2 kg of water, about 45 g of Hexamethonium Dihydroxide (~25-50% solution), about 228 g of Ultrasil™ silica, about 16 g of sodium aluminate solution (~45%), about 1.3 g of ~98% $H_2SO_4$ solution, about 10 g of ZSM-48 seeds, and about 40 g of ~50% sodium hydroxide solution. It is noted that the only potential structure directing agent (SDA) included in the synthesis mixture was the hexamethonium dihydroxide. The sulfuric acid in the reaction mixture was used to control the amount of $OH^-$. The mixture had the following molar composition.

TABLE 10

| Reactants | Molar ratio |
| --- | --- |
| $SiO_2:Al_2O_3$ | ~81.3 |
| $H_2O:SiO_2$ | ~20.3 |
| $OH^-:SiO_2$ | ~0.16 |
| $Na^+:SiO_2$ | ~0.17 |
| SDA:$SiO_2$ | ~0.025 |

The mixture was reacted at ~320° F. (~160° C.) in a ~2-liter autoclave with stirring at ~250 RPM for ~48 hours. The resulting product was filtered, washed with deionized (DI) water, and dried at ~250° F. (~120° C.). The XRD pattern of the as-synthesized material showed that the main phase corresponded to Kenyaite impurity. This example demonstrates that directly using the hexamethonium directing agent with a hydroxide ion does not yield the same results as using hexamethonium chloride as a dominant directing agent and a tetraalkyl ammonium hydroxide as a secondary directing agent.

Examples 11, 12, and 13: Preparation of Bound Catalysts (Steamed) with Supported Pt Bound alumina catalysts were formed by extrusion using ~65 wt % of ZSM-48 samples corresponding to Examples 5, 7, and 9 and ~35 wt % alumina (Versal™ 300). The resulting extrudates were calcined in nitrogen (for ~3 hours at ~1000° F.), ammonium exchanged with ~1N ammonium nitrate solution, and calcined in air (for ~6 hours at ~1000° F.). The H-formed extrudates were then steamed prior to testing to achieve at least about 80% decane isomerization at about 90% conversion of decane under decane isomerization conditions as described below. The resulting steamed extrudates were then impregnated via incipient wetness to ~0.6 wt % Pt with tetraammineplatinumnitrate followed by calcination in air (for ~3 hours at ~680° F.).

Decane Isomerization

Decane isomerization tests were performed to characterize the activity and selectivity of the samples corresponding to Examples 11, 12, and 13. The tests were performed at atmospheric pressure (~0 psig), and the reactor vessel was quartz. Catalysts were crushed and sized to ~14/25 mesh, and ~1 g of sized catalyst was used for each test. Each sample was first heated under nitrogen to ~500° F., followed by reduction in hydrogen for ~3 hours at atmospheric pressure. The temperature was then decreased to ~365° F., and the flow of feed was started. The feed comprised ~100 sccm/min of hydrogen and 0.546 cc/hr of liquid n-decane, delivered by MFC and ISCO pumps, respectively. After lining the catalyst out at this temperature, the product from the reactor was analyzed by an on-line GC, and the next set point temperature was attained. Each catalyst was evaluated at a total of 8 different temperatures from ~365° F. to ~515° F. For comparison, results are also provided for an alumina bound catalyst containing ZSM-48 crystals formed using only a diquat-6 structure directing agent without a secondary structure directing agent. The comparative ZSM-48 crystals had a silica to alumina ratio of about 90:1.

As shown in FIGS. 7 and 8, forming ZSM-48 crystals from synthesis mixtures containing both a dominant and a secondary structure directing agent allowed for formation of ZSM-48 crystals with activity comparable to the activity of ZSM-48 crystals formed using only the dominant structure directing agent. It is noted that the silica to alumina ratio of the ZSM-48 crystals for the catalysts in Examples 12-14 was about 70:1, while the catalyst made using the comparative ZSM-48 crystals had a silica to alumina ratio of about 90:1. It is believed that the small differences in the selectivity and conversion curves shown in FIGS. 7 and 8 between Examples 11-13 and the comparative catalyst may be due at least in part to this difference in silica to alumina ratio.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method of synthesizing ZSM-48 zeolite crystals, the method comprising:
    crystallizing a reaction mixture to form ZSM-48 zeolite crystals under effective synthesis conditions, the reaction mixture comprising a source of water, a source of silicon, a source of aluminum, a source of an alkali metal, M, a source of a dominant structure directing agent in the form of an organic cation $Q_1$, and a source of a secondary structure directing agent in the form of an organic cation $Q_2$, a combined amount of dominant structure directing agent cation $Q_1$ and secondary structure directing agent cation $Q_2$ corresponding to a combined amount of structure directing agent cation Q,
    wherein the dominant structure directing agent $Q_1$ is a salt comprising a dihalide anion component and a cation component comprising is a diquaternary ammonium cation represented by the formula RR'R"—$N^+$—$R_3$—$N^+$—RR'R", wherein each R, R', and R" are the same or different and each R, R', and R" is an alkyl group having from 1 to 10 carbons and $R_3$ is a polymethylene group of formula $(CH_2)_n$, where n=5 or 6,
    wherein the secondary structure directing agent cation does not enable formation of the zeolite crystals under the effective synthesis conditions, the secondary structure directing agent being a tetraalkyl ammonium hydroxide, and
    wherein the amount of secondary structure directing agent cation $Q_2$ is at least about 20 mol % of the combined amount of structure directing agent cation Q.

2. The method of claim 1, wherein the reaction mixture further comprises seeds of the zeolite crystals in an amount such that a weight percent of seeds relative to total weight of silicon measured as $SiO_2$ in said reaction mixture is between about 0.1 wt % and about 20 wt %.

3. The method of claim 1, wherein the secondary structure directing agent is tetramethyl ammonium hydroxide, tetraethyl ammonium hydroxide, tetrapropyl ammonium hydroxide, tetrabutyl ammonium hydroxide, or a combination thereof.

4. The method of claim 3, wherein the secondary structure directing agent cation is tetraethyl ammonium.

5. The method of claim 1, wherein a molar ratio of the amount of secondary structure directing agent $Q_2$ to the amount of hydroxyl ions is at least about 1:10.

6. The method of claim 1, wherein the amount of secondary structure directing agent cation $Q_2$ is at least about 25 mol % of the combined amount of structure directing agent cation Q.

7. An as-synthesized zeolite crystal made according to the method of claim 1, and further comprising both the dominant structure directing agent cation $Q_1$ and the secondary structure directing agent cation $Q_2$ within its pore structure, wherein the dominant structure directing agent cation $Q_1$ comprises a diquat-5, a diquat-6, or a combination thereof, and wherein the secondary structure directing agent cation $Q_2$ comprises tetramethyl ammonium hydroxide, tetraethyl ammonium hydroxide, tetrapropyl ammonium hydroxide, tetrabutyl ammonium hydroxide, or a combination thereof.

8. The as-synthesized zeolite crystal according to claim 7, wherein the secondary structure directing agent cation $Q_2$ comprises tetraethyl ammonium hydroxide.

9. A method of synthesizing ZSM-48 crystals, the method comprising:
    crystallizing a reaction mixture to form ZSM-48 crystals under effective synthesis conditions, the reaction mixture comprising a source of water, a source of silicon, a source of aluminum, a source of an alkali metal, M, a source of a dominant structure directing agent in the form of an organic cation $Q_1$, and a source of a secondary structure directing agent in the form of an organic cation $Q_2$, a combined amount of dominant structure directing agent cation $Q_1$ and secondary structure directing agent cation $Q_2$ corresponding to a combined amount of structure directing agent cation Q,
    the reaction mixture having a molar ratio of combined structure directing agent cation Q to silicon measured as $SiO_2$ in said reaction mixture from about 0.01 to about 0.20; a molar ratio of silicon measured as $SiO_2$ to aluminum measured as $Al_2O_3$ in said reaction mixture from about 50 to about 200; a molar ratio of water to silicon measured as $SiO_2$ in said reaction mixture from about 1 to about 500; a molar ratio of hydroxyl group concentration to silicon measured as silica $SiO_2$ in said reaction mixture is from about 0.1 to about 0.3; and a molar ratio of alkali metal, M, to silicon measured as $SiO_2$ in said reaction mixture is from about 0.05 to about 0.4, wherein the dominant structure directing agent is a salt comprising a dihalide anion component and a cation component comprising is a diquaternary ammonium cation represented by the formula RR'R"—$N^+$—$R_3$—$N^+$—RR'R", wherein each R, R', and R" are the same or different and each R, R', and R" is an alkyl group having from 1 to 10 carbons and $R_3$ is a polymethylene group of formula $(CH_2)_n$, where n=5 or 6, wherein the secondary structure directing agent cation does not enable formation of ZSM-48 under the effective synthesis conditions, the secondary structure directing agent being a tetraalkyl ammonium hydroxide, and wherein an amount of secondary structure directing agent cation $Q_2$ is at least about 20 mol % of the combined amount of structure directing agent cation Q.

10. The method of claim 9, wherein the secondary structure directing agent is tetramethyl ammonium hydroxide, tetraethyl ammonium hydroxide, tetrapropyl ammonium hydroxide, tetrabutyl ammonium hydroxide, or a combination thereof.

11. The method of claim 9, wherein the secondary structure directing agent cation is tetraethyl ammonium.

12. The method of claim 9, wherein a molar ratio of the amount of secondary structure directing agent $Q_2$ to the amount of hydroxyl ions is at least about 1:10.

13. The method of claim 9, wherein the amount of secondary structure directing agent cation $Q_2$ is at least about 25 mol % of the combined amount of structure directing agent cation Q.

14. The method of claim 9, wherein the reaction mixture further comprises seeds of ZSM-48 in an amount such that a weight percent of seeds relative to total weight of silicon measured as $SiO_2$ in said reaction mixture is between about 0.1 wt % and about 20 wt %.

15. The method of claim 9, wherein at least 50 vol % of the as-synthesized ZSM-48 crystals have a fibrous morphology.

16. The method of claim 9, wherein at least 50 vol % of the as-synthesized ZSM-48 crystals have a needle-like morphology.

17. The method of claim 9, wherein the reaction mixture has a molar ratio of combined structure directing agent cation Q to silicon measured as $SiO_2$ in said reaction mixture from about 0.01 to about 0.05; a molar ratio of silicon measured as $SiO_2$ to aluminum measured as $Al_2O_3$ in said reaction mixture from about 50 to about 150; a molar ratio of water to silicon measured as $SiO_2$ in said reaction mixture from about 1 to about 500; a molar ratio of hydroxyl group concentration to silicon measured as $SiO_2$ in said reaction mixture is from about 0.1 to about 0.3; and a molar ratio of alkali metal, M, to silicon measured as $SiO_2$ in said reaction mixture is from about 0.05 to about 0.4.

18. The method of claim 17, wherein the molar ratio of silicon measured as $SiO_2$ to aluminum measured as $Al_2O_3$ in said reaction mixture is from about 65 to about 120.

19. An as-synthesized ZSM-48 crystal made according to the method of claim 9, and further comprising both the dominant structure directing agent cation $Q_1$ and the secondary structure directing agent cation $Q_2$ within its pore structure.

20. The as-synthesized ZSM-48 crystal according to claim 19, wherein the secondary structure directing agent cation $Q_2$ comprises tetramethyl ammonium hydroxide, tetraethyl ammonium hydroxide, tetrapropyl ammonium hydroxide, tetrabutyl ammonium hydroxide, or a combination thereof.

21. The as-synthesized ZSM-48 crystal according to claim 20, wherein the secondary structure directing agent cation $Q_2$ comprises tetraethyl ammonium hydroxide.

\* \* \* \* \*